US006591364B1

(12) United States Patent
Patel

(10) Patent No.: US 6,591,364 B1
(45) Date of Patent: Jul. 8, 2003

(54) METHOD FOR ESTABLISHING SESSION KEY AGREEMENT

(75) Inventor: Sarvar Patel, Montville, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/141,580

(22) Filed: Aug. 28, 1998

(51) Int. Cl.[7] .................................................. H04L 9/00
(52) U.S. Cl. ........................................ 713/170; 380/270
(58) Field of Search ........................... 713/170; 380/270

(56) References Cited

U.S. PATENT DOCUMENTS

| 4,649,233 A | * | 3/1987 | Bass et al. ..................... 380/21 |
| 5,153,919 A | | 10/1992 | Reeds, III et al. |
| 5,594,795 A | * | 1/1997 | Dent et al. ..................... 380/23 |
| 6,058,309 A | | 5/2000 | Huang et al. ............... 455/433 |

OTHER PUBLICATIONS

Bird et. al., Systemtic Design of Two–Party Authentication Protocols, Crypto 91, pp. 44–61.*
Park, Chang–Seop: "On Certificate–Based Security Protocols for Wireless Mobile Communication Systems", IEEE Network: The Magazine of Computer Communications, US, IEEE Inc. New York, vol. 11, No. 5, Sep. 1, 1997, pp. 50–55.
Brown D: "Techniques for Privacy and Authentication in Personal Communication Systems a well Designed P&A Technique is Necessary to Protect Assets", IEEE Personal Communications, US, IEEE Communications Society, vol. 2, No. 4, Aug. 1, 1995, pp. 6–10.
Aziz A et al.: "Privacy and Authentication for Wireless Local Area Networks a Secure Communications Protocol to Prevent Unauthorized Access", IEEE Personal Communications, US, IEEE Communications Society, vol. 1, No. 1, Mar. 31, 1994, pp. 25–31.
M. Bellare and P. Rogaway, Entity authentication and key distribution, *Advances in Cryptology—Crypto*, 1993.
S. Bellovin and M. Merritt, Encrypted key exchange: password–based protocols secure against dictionary attacks, *IEEE computer society symposium on research in security and privacy*, 72–84 May 1992.
R. Bird and I. Gopal, A. Herzberg, P. Janson, S. Kutten, R. Molva, and M. Yung, Systematic design of two–party authentication protocols, *Advances in Cryptology—Crypto*, 1991.
M. Blum and S. Micali, How to generate cryptographically strong sequences of pseudo random bits, *SIAM J. Computing*, 13 No. 4:850–864, 1984.
R. B. Boppana, R. Hirschfeld, Pseudorrandom generators and complexity classes, *Advances in Computing Research*, 5 (S. Micali, Ed.), JAI Press, CT.
U.S. Department of Commerce/N.I.S.T., *Digital Signature Standard*, FIPS 186, May 1994.

(List continued on next page.)

Primary Examiner—Gail Hayes
Assistant Examiner—James Seal

(57) ABSTRACT

In the method for establishing a session key, a network and a mobile transfer codes between one another. The mobile and the network perform mutual authentication based on the codes. Besides performing this mutual authentication, the mobile and the network to establish the session key based on the codes. In one embodiment, the messages forming part of the intended session are sent with the codes, and form a basis upon which the codes for authentication have been derived.

47 Claims, 3 Drawing Sheets

OTHER PUBLICATIONS

O. Goldreich and L. A. Levin, A hard–core predicate for all one way functions, *Proceedings of 21st STOC*, 25–32, 1989.

S. Goldwasser and A. Micali, Probabilistic encryption, *Journal of Computer and Systems Science*, 28: 270–299, 1984.

L. Gong, T. Lomas, R. Needham and J. Saltzer, Protecting poorly chosen secrets from guessing attacks, *IEEE Journal on Selected Areas in Communications*, 11(5): 648–656, Jun. 1993.

EIA/TIA, Cellular RadioTelecommunications Intersystem Operations IS–41 Rev. D, 1997.

T. Lomas, L. Gong, J. Saltzer and R. Needham, Reducing Risks from Poorly Chosen Keys, *Proceedings of the 12th ACM Symposium on Operating System Principles, ACM Operating Systems Review*, 23(5): 14–18, Dec. 1989.

S. Patel, Information Leakage in Encrypted Key Exchange, *Proceedings of DIMACS workshop on Network Threats*, 38: 33–40, Dec. 1996.

S. Patel, Number theoretic attacks on secure password schemes, *IEEE symposium on security and privacy*, 236–247, May 1997.

S. Patel, Weaknesses of the north american wireless authentication protocol, *IEEE Personal Communications*, 40–44, Jun., 1997.

A. C. Yao, Theory and applications of trapdoor functions, *Proceedings of 23rd FOCS*, 80–91, 1982.

M. Beller, L. Chang and Y. Yacobi, Privacy and authentication on a portable communication system, *IEEE J. Selected Areas in Communications*, 11(6): 821–829, 1993.

C. Carroll, Y. Frankel and Y. Tsiounis, Efficient key distribution for slow computing devices: Achieving fast over the air activation for wireless system, *IEEE symposium on security and privacy*, May 1998.

TIA/EIA Interim Standard, *Over–the Air Service Provisioning of Mobile Stations in Spread Spectrum Systems*, IS–683–A, Jun. 1998.

E. Blossom, The VPI Protocol for Voice Privacy Devices, Dec. 1996.

O. Goldreich, S. Goldwasser and A. Micali, On the cryptographic applications of random functions, *Advances in Cryptology—Crypto*, 1984.

D. Jablon, Strong Password–Only Authenticated Key Exchange, *ACM SIG–COMM Computer Communications Review*, Oct. 1996.

S. Lucks, Open Key Exchange: How to defeat dictionary attacks without encrypting public keys, Proceedings of the Security Protocol Workshop '97, 1997.

Osed Goldreich, Shafi Goldwasser, Silvio Micali, How to Construct Random Functions, Journal of the Association for Computing Machinery, vol. 33, No. 4, pp. 792–807, Oct. 1986.

\* cited by examiner

METHOD FOR ESTABLISHING SESSION KEY AGREEMENT

RELATED APPLICATIONS

The following applications, filed on Jul. 31, 1998, are related to the subject application and are hereby incorporated by reference in their entirety: application Ser. No. 09/127,767 entitled METHOD FOR TWO PARTY AUTHENTICATION AND KEY AGREEMENT by the inventor of the subject application, application Ser. No. 09/127,768, now U.S. Pat. No. 6,243,811 entitled METHOD FOR UPDATING SECRET SHARED DATA IN A WIRELESS COMMUNICATION SYSTEM by the inventor of the subject application; application Ser. No. 09/127,766, now U.S. Pat. No. 6,249,867 entitled METHOD FOR TRANSFERRING SENSITIVE INFORMATION USING INTIALLY UNSECURED COMMUNICATION by the inventor of the subject application; application Ser. No. 09/127,045 entitled METHOD FOR SECURING OVER-THE-AIR COMMUNICATION IN A WIRELESS SYSTEM by the inventor of the subject application; and application Ser. No. 09/127,769, now U.S. Pat. No. 6,192,474 entitled METHOD FOR ESTABLISHING A KEY USING OVER-THE-AIR COMMUNICATION AND PASSWORD PROTOCOL AND PASSWORD PROTOCOL by the inventor of the subject application and Adam Berenzweig.

The following applications, filed concurrently with the subject application, are related to the subject application and are hereby incorporated by reference in their entirety: application Ser. No. 09/141,581 entitled METHOD FOR DETERMINING TEMPORARY MOBILE IDENTIFIERS AND MANAGING USE THEREOF by the inventor of the subject application and application Ser. No. 09/141,582 entitled METHOD FOR PROTECTING MOBILE ANONYMITY by the inventor of the subject application.

BACKGROUND OF THE INVENTION

1. Field of the Invention

The present invention relates to a method for establishing a session key in a wireless system.

2. Description of Related Art

The U.S. currently utilizes three major wireless systems, with differing standards. The first system is a time division multiple access system (TDMA) and is governed by IS-136, the second system is a code division multiple access (CDMA) system governed by IS-95, and the third is the Advanced Mobile Phone System (AMPS). All three communication systems use the IS-41 standard for intersystem messaging, which defines the authentication procedure for call origination, updating the secret shared data, and etc.

FIG. 1 illustrates a wireless system including an authentication center (AC) and a home location register (HLR) 10, a visiting location register (VLR) 15, and a mobile 20. While more than one HLR may be associated with an AC, currently a one-to-one correspondence exists. Consequently, FIG. 1 illustrates the HLR and AC as a single entity, even though they are separate. Furthermore, for simplicity, the remainder of the specification will refer to the HLR and AC jointly as the AC/HLR. Also, the VLR sends information to one of a plurality of mobile switching centers (MSCs) associated therewith, and each MSC sends the information to one of a plurality of base stations (BSs) for transmission to the mobile. For simplicity, the VLR, MSCs and BSs will be referred to and illustrated as a VLR. Collectively, the ACs, HLRs, VLRs, MSCs, and BSs operated by a network provider are referred to as a network.

A root key, known as the A-key, is stored only in the AC/HLR 10 and the mobile 20. There is a secondary key, known as Shared Secret Data SSD, which is sent to the VLR 15 as the mobile roams (i.e., when the mobile is outside its home coverage area). The SSD is generated from the A-key and a random seed RANDSSD using a cryptographic algorithm or function. A cryptographic function is a function which generates an output having a predetermined number of bits based on a range of possible inputs. A keyed cryptographic function (KCF) is a type of cryptographic function that operates based on a key; for instance, a cryptographic function which operates on two or more arguments (i.e., inputs) wherein one of the arguments is the key. From the output and knowledge of the KCF in use, the inputs can not be determined unless the key is known. Encryption/decryption algorithms are types of cryptographic functions. So are one-way functions like pseudo random functions (PRFs) and message authentication codes (MACs). The expression $KCF_{SK}(R_N')$ represents the KCF of the random number $R_N'$ using the session key SK as the key. A session key is a key that lasts for a session, and a session is a period of time such as the length of a call.

In the IS-41 protocol, the cryptographic function used is CAVE (Cellular Authentication and Voice Encryption). When the mobile 20 roams, the VLR 15 in that area sends an authentication request to the AC/HLR 10. If operating in an unshared mode, the AC/HLR 10, using the VLR 15 as a communication conduit, authenticates the mobile 20 using the SSD associated with the mobile 20. However, in the shared mode, the AC/HLR 10 responds to the authentication request by sending the mobile's SSD to the VLR 15. Once the VLR 15 has the SSD, it can authenticate the mobile 20 independently of the AC/HLR 10. For security reasons, the SSD is periodically updated.

The SSD is 128 bits long. The first 64 bits serve as a first SSD, referred to as SSDA, and the second 64 bits serve as a second SSD, referred to as SSDB. The SSDA is used in the protocol to update the SSD, and the mobile 20 and the network generate session keys using SSDB. In updating the SSD, IS-41 provides of measure of security by performing mutual authentication (i.e., the mobile and the network authenticate one another) during the update process. However, in generating session keys, IS-41 does not provide for mutual authentication.

SUMMARY OF THE INVENTION

In the method for establishing a session key, a network and a mobile transfer codes between one another. The mobile uses these codes to authenticate the network, and the network uses these codes to authenticate the mobile. Besides performing this mutual authentication, the codes are used by the mobile and the network to establish the session key. In one embodiment, communication efficiency is improved by sending messages, forming part of the intended session, with the codes. Furthermore, the codes for performing mutual authentication are derived based on the messages.

BRIEF DESCRIPTION OF THE DRAWINGS

The present invention will become more fully understood from the detailed description given below and the accompanying drawings which are given by way of illustration only, wherein like reference numerals designate corresponding parts in the various drawings, and wherein.

DETAILED DESCRIPTION OF THE PREFERRED EMBODIMENTS

Figure 1:
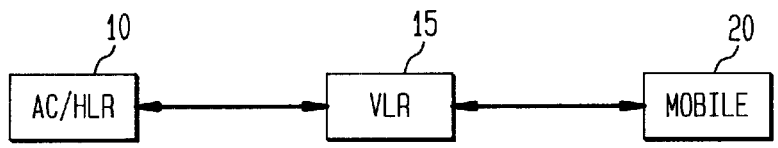
FIG. 1 is a block diagram illustrating the basic components of a wireless system.

The method for establishing session keys according to the present invention will be described as employed by the wireless system shown in FIG. 1. For the purposes of discussion only, operation in the shared manner will be described, but one skilled in the art will understand that the system may also operate in the unshared mode. Furthermore, while numerous sessions exist, for purposes of providing examples only, the method according to the present invention will be described with respect to establishing session keys during call origination and call termination. It will also be appreciated that, for clarity, the transfer of well-known information, such as the mobile's identity information (e.g., mobile identification number, electronic serial number, etc.), between the mobile 20 and the network has not been described.

Figure 2:
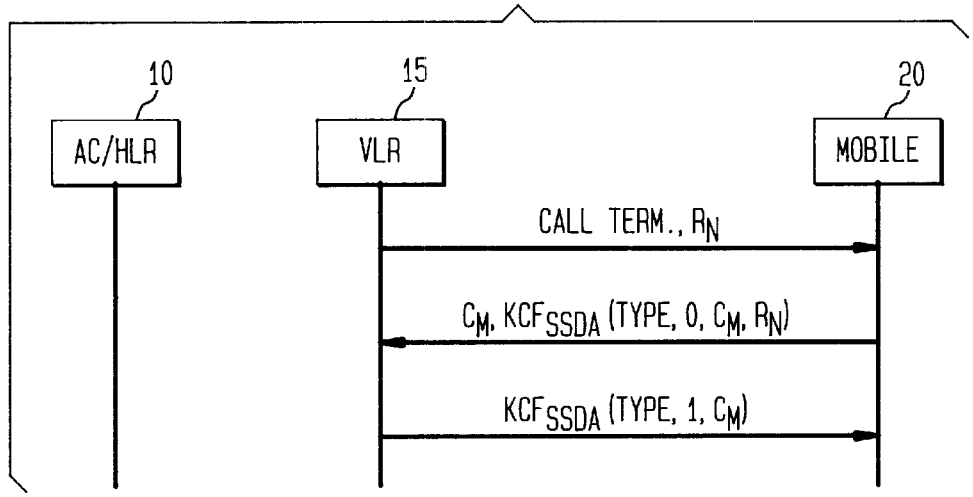
FIG. 2 illustrates the communication between the network and the mobile to establish a session key during call termination according to a first embodiment of the present invention.

FIG. 2 illustrates the communication between the network and the mobile 20 to establish a session key during call termination according to a first embodiment of the present invention. As shown, the VLR 15 generates a random number $R_N$ using a random number generator, and sends the random number $R_N$ to the mobile 20 as a challenge along with a call termination request.

In response, the mobile 20 generates a count value $C_M$, and performs a KCF on the random number $R_N$, the count value $C_M$, Type data, and id data 0 using the SSDA as the key. This calculation is represented as $KCF_{SSDA}(Type, 0, C_M, R_N)$. Preferably, the KCF is a keyed message authentication code such as HMAC, but could be a PRF such as Data Encryption Standard-Cipher Block Chaining (DES-CBC) from NIST (National Institute of Standards). The mobile 20 includes a counter which generates the count value $C_M$, and increments the count value $C_M$ prior to generating the challenge response (i.e., $KCF_{SSDA}(Type, 0, C_M, R_N)$) to each challenge from the network.

The Type data represents the type of protocol being performed. Types of protocols include, for example, call termination, call origination, mobile registration, etc. The id data 0 indicates that the communication issued from a mobile, and id data 1 indicates that communication is from the network.

The mobile 20 sends count value $C_M$ and $KCF_{SSDA}(Type, 0, C_M, R_N)$ to the network. Because the VLR 15 initiated the current call termination protocol including the protocol for establishing a session key according to the present invention, the VLR 15 knows the Type data. Also, because communication from mobiles includes the same id data, this value is known by the VLR 15 as well. Accordingly, based on the received count value $C_M$, the VLR 15 calculates $KCF_{SSDA}(Type, 0, C_M, R_N)$ and determines whether this calculated value matches the version received from the mobile 20. If a match is found, the VLR 15 authenticates the mobile 20.

Once the mobile 20 has been authenticated, the VLR 15 calculates $KCF_{SSDA}(Type, 1, C_M)$, and sends the calculated result to the mobile 20. The mobile 20, meanwhile, calculates $KCF_{SSDA}(Type, 1, C_M)$ as well. The mobile 20 then verifies whether the calculated version of $KCF_{SSDA}(Type, 1, C_M)$ matches the version received from the VLR 15. If a match is found, the mobile 20 authenticates the network. Both the mobile 20 and the VLR 15 generate the session key SK as $PRF_{A-Key}(C_M, R_N)$; wherein the PRF is preferably the DES-CBC algorithm.

The mobile 20 stores the count value $C_M$ in semipermanent memory so that during power down, the count value $C_M$ is not re-initialized. This way, repetition of a count value is prevented; repetition of the count value permits an attacker to prevail in his attack. In a preferred embodiment, the count value is initialized using a random number and generated using a large bit counter such as a 64 or 75 bit counter. This provides security even when the mobile 20 crashes and loses the stored count value. Even if an attacker can cause a mobile to crash at will, and assuming it takes at least a second to initiate a session, it will take, for example, a year before the attacker manages to have the mobile repeat a count value when a 75 bit counter is used.

As an alternative, instead of generating and sending a unique random number $R_N$ to each mobile, the VLR 15 generates a global random number $R_N$; namely, the same random number for all the mobiles. In this alternative embodiment, the network sends the call termination request as a page on a control channel.

This alternative embodiment applies, however, when the anticipated response time for the mobile 20, as monitored by the network, is kept relatively the same as when a unique random number $R_N$ is sent. Stated another way, this alternative embodiment applies when the validity period of the global random number is kept relatively short. If a longer validity period for global random numbers is desired, then, preferably, for the duration of a global random number the VLR 15 stores the count value $C_M$ and determines whether the received count value $C_M$ exceeds the previously stored count value. If the received count value $C_M$ does exceed the previously stored count value, then the VLR 15 goes forward with authenticating the mobile 20. If the received count value $C_M$ does not exceed the previously stored count value, the mobile 20 is not authenticated. When a new global random number is sent by the VLR 15, the stored count values for each mobile are erased, and the process of storing and comparing count values begins again.

Figure 3:
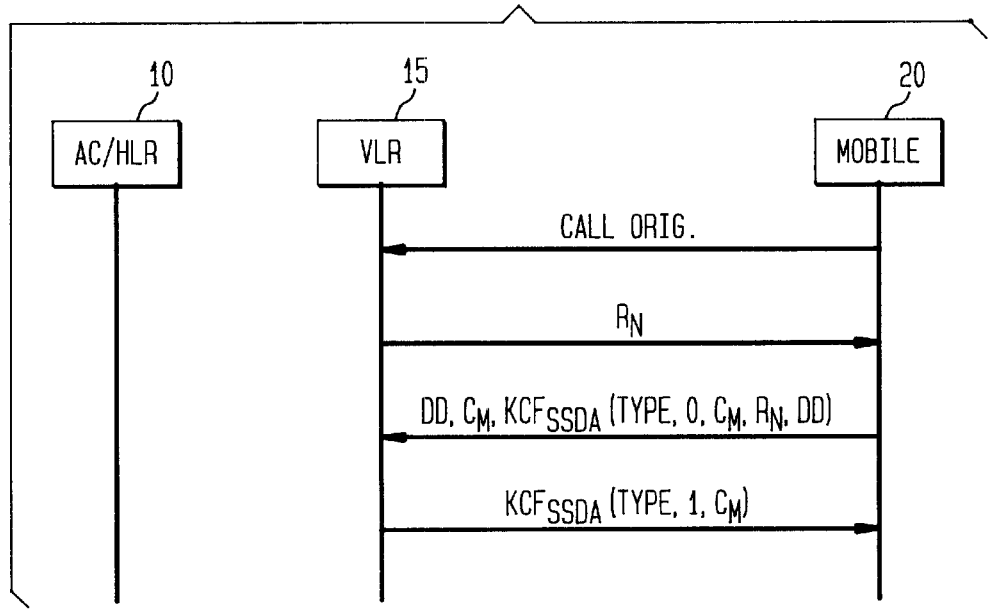
FIG. 3 illustrates the communication between the network and the mobile to establish a session key during call origination according to the first embodiment of the present invention.

FIG. 3 illustrates the communication between the network and the mobile 20 to establish a session key during call origination according to the first embodiment of the present invention. As shown, the mobile 20 sends a call origination request to the VLR 15. In return, the VLR 15 generates the random number $R_N$ using a random number generator, and sends the random number $R_N$ to the mobile 20.

In response, the mobile 20 generates the count value $C_M$, and performs a KCF on the random number $R_N$, the dialed digits DD, the count value $C_M$, Type data, and id data 0 using the SSDA as the key. This calculation is represented as $KCF_{SSDA}$(Type, 0, $C_M$, $R_N$, DD). The dialed digits DD are the telephone number of the party the mobile user wants to call.

The mobile 20 sends the dialed digits DD, the count value $C_M$ and $KCF_{SSDA}$(Type, 0, $C_M$, $R_N$, DD) to the network. Because the VLR 15 received the call origination request, the VLR 15 knows the Type data. Accordingly, based on the received dialed digits and count value $C_M$, the VLR 15 calculates $KCF_{SSDA}$(Type, 0, $C_M$, $R_N$, DD) and determines whether this calculated value matches the version received from the mobile 20. If a match is found, the VLR 15 authenticates the mobile 20.

Once the mobile 20 has been authenticated, the VLR 15 calculates $KCF_{SSDA}$(Type, 1, $C_M$), and sends the calculated result to the mobile 20. The mobile 20, meanwhile, calculates $KCF_{SSDA}$(Type, 1, $C_M$) as well. The mobile 20 then verifies whether the calculated version of $KCF_{SSDA}$(Type, 1, $C_M$) matches the version received from the VLR 15. If a match is found, the mobile 20 authenticates the network.

Both the mobile 20 and VLR 15 generate the session key SK as $PRF_{A-Key}(C_M, R_N)$; wherein the PRF is preferably the DES-CBC algorithm.

As discussed above, mobile 20 stores the count value $C_M$ in semi-permanent memory, and the count value is initialized using a random number and generated using a large bit counter such as a 64 or 75 bit counter.

As an alternative, instead of generating and sending a unique random number $R_N$ to each mobile, the VLR 15 generates a global random number $R_N$; namely, the same random number for all the mobiles.

This alternative embodiment applies, however, when the anticipated response time for the mobile 20, as monitored by the network, is kept relatively the same as when a unique random number $R_N$ is sent. Stated another way, this alternative embodiment applies when the validity period of the global random number is kept relatively short. If a longer validity period for global random numbers is desired, then, preferably, for the duration of a global random number the VLR 15 stores the count value $C_M$ and determines whether the received count value $C_M$ exceeds the previously stored count value. If the received count value $C_M$ does exceed the previously stored count value, then the VLR 15 goes forward with authenticating the mobile 20. If the received count value $C_M$ does not exceed the previously stored count value, the mobile 20 is not authenticated. When a new global random number is sent by the VLR 15, the stored count values for each mobile are erased, and the process of storing and comparing count values begins again.

Figure 4:
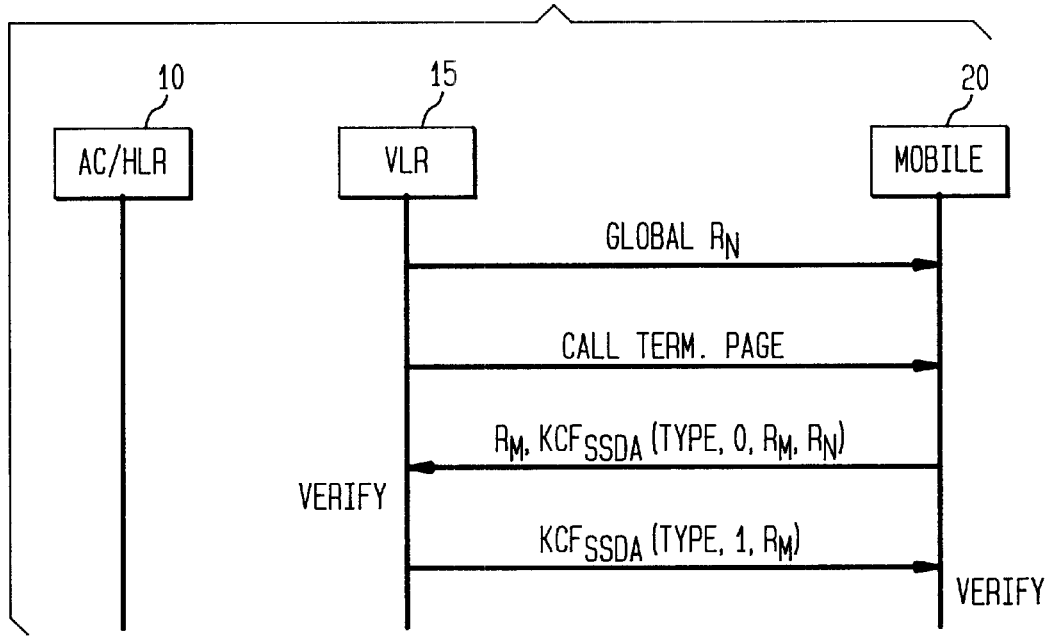
FIG. 4 illustrates the communication between the network and the mobile to establish a session key during call termination according to a second embodiment of the present invention.

FIG. 4 illustrates the communication between the network and the mobile 20 to establish a session key during call termination according to a second embodiment of the present invention. As shown, the VLR 15 generates a random number $R_N$ using a random number generator, and sends the random number $R_N$ as a global challenge. When establishing a session key for call termination with the mobile 20, the VLR 15 sends a call termination request as a page to the mobile 20 on a control channel.

In response, the mobile 20 generates, using a random number generator, a random number $R_M$, and performs a KCF on the random number $R_N$, the random number $R_M$, Type data, and id data 0 using the SSDA as the key. This calculation is represented as $KCF_{SSDA}$(Type, 0, $R_M$, $R_N$). Preferably, the KCF is a keyed message authentication code such as HMAC, but could be a PRF such as Data Encryption Standard-Cipher Block Chaining (DES-CBC) from NIST (National Institute of Standards).

The mobile 20 sends the random number $R_M$ and KCF-SSDA (Type, 0, $R_M$, $R_N$) to the network. Based on the received random number $R_M$, the VLR 15 calculates $KCF_{SSDA}$(Type, 0, $R_M$, $R_N$) and determines whether this calculated value matches the version received from the mobile 20. If a match is found, the VLR 15 authenticates the mobile 20.

Once the mobile 20 has been authenticated, the VLR 15 calculates $KCF_{SSDA}$(Type, 1, $R_M$), and sends the calculated result to the mobile 20. The mobile 20, meanwhile, calculates $KCF_{SSDA}$(Type, 1, $R_M$) as well. The mobile 20 then verifies whether the calculated version of $KCF_{SSDA}$(Type, 1, $R_M$) matches the version received from the VLR 15. If a match is found, the mobile 20 authenticates the network.

Both the mobile 20 and the VLR 15 generate the session key SK as $PRF_{A-Key}(R_M, R_N)$; wherein the PRF is preferably the DES-CBC algorithm.

Furthermore, the embodiment of FIG. 4 applies when the anticipated response time for the mobile 20, as monitored by the network, is kept relatively the same as when a unique random number $R_N$ is sent. Stated another way, this embodiment applies when the validity period of the global random number is kept relatively short. If a longer validity period for global random numbers is desired, then, preferably, the mobile 20 generates a count value CT in addition to the random number $R_M$.

Specifically, when a new global random number $R_N$ is received, the mobile 20 initializes a counter included therein. Each time the mobile 20 generates a random number $R_M$ and a challenge response, the mobile 20 increments the counter to obtain the count value CT. Furthermore, the challenge response generated by the mobile 20 is $KCF_{SSDA}$ (Type, 0, $R_M$, $R_N$, CT), and the mobile 20 sends the count value CT, the random number $R_M$ and this challenge response to the network. The VLR 15 stores received count values from each mobile for the duration of a global random number $R_N$, and determines whether a count value CT received from a mobile exceeds the previously stored count value for that mobile. If the received count value CT does exceed the previously stored count value, then the VLR 15 goes forward with authenticating the mobile 20. If the received count value CT does not exceed the previously stored count value, the mobile 20 is not authenticated.

If the VLR 15 goes forward with authenticating the mobile 20, the VLR 15 generates and sends a challenge response of $KCF_{SSDA}$(Type, 1, $R_M$, CT). Additionally, in generating the session key, the mobile 20 and the VLR 15 calculate the session key as $PRF_{A-Key}(R_M, R_N, CT)$.

Figure 5:
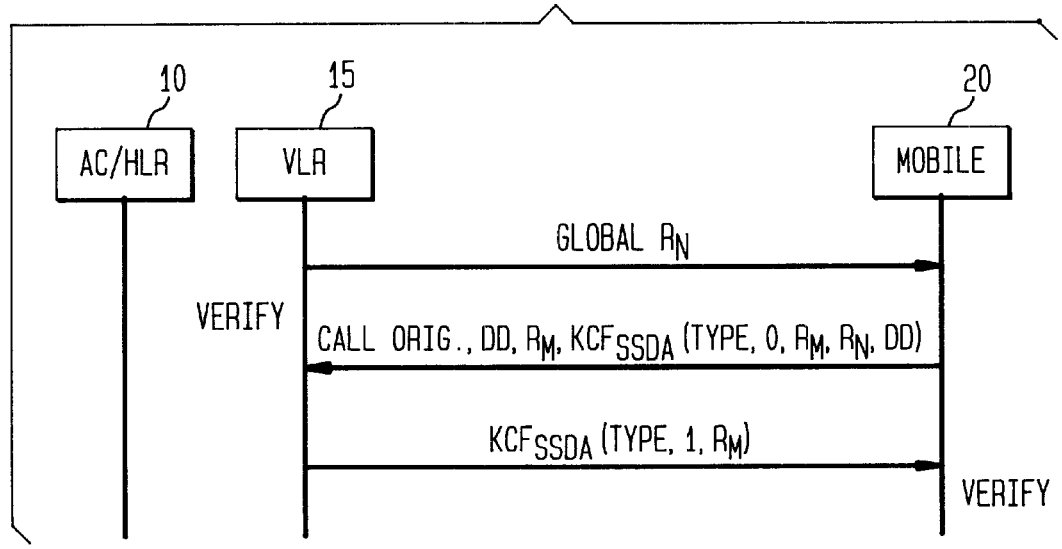
FIG. 5 illustrates the communication between the network and the mobile to establish a session key during call origination according to the second embodiment of the present invention.

FIG. 5 illustrates the communication between the network and the mobile 20 to establish a session key during call origination according to the second embodiment of the present invention. As shown, the mobile 20 sends a call origination request to the VLR 15. In return, the VLR 15 generates the random number $R_N$ using a random number generator, and sends the random number $R_N$ as a global challenge.

When the mobile user dials digits to make a call, the mobile 20 generates a random number $R_M$ using a random number generator and performs a KCF on the random number $R_N$, the dialed digits DD, the random number $R_M$, Type data, and id data 0 using the SSDA as the key. This calculation is represented as $KCF_{SSDA}$(Type, 0, $R_M$, $R_N$, DD).

The mobile 20 sends the dialed digits DD, the random number $R_M$ and $KCF_{SSDA}$(Type, 0, $R_M$, $R_N$, DD) to the network. Based on the received dialed digits and random number $R_M$, the VLR 15 calculates $KCF_{SSDA}$(Type, 0, $R_M$, $R_N$, DD) and determines whether this calculated value matches the version received from the mobile 20. If a match is found, the VLR 15 authenticates the mobile 20.

Once the mobile 20 has been authenticated, the VLR 15 calculates $KCF_{SSDA}$(Type, 1, $R_M$), and sends the calculated result to the mobile 20. The mobile 20, meanwhile, calculates $KCF_{SSDA}$(Type, 1, $R_M$) as well. The mobile 20 then verifies whether the calculated version of $KCF_{SSDA}$(Type, 1, $R_M$) matches the version received from the VLR 15. If a match is found, the mobile 20 authenticates the network.

Both the mobile 20 and VLR 15 generate the session key SK as $PRF_{A\text{-}Key}(R_M, R_N)$; wherein the PRF is preferably the DES-CBC algorithm.

Furthermore, the embodiment of FIG. 5 applies when the anticipated response time for the mobile, as monitored by the network, is kept relatively the same as when a unique random number $R_N$ is sent. Stated another way, this embodiment applies when the validity period of the global random number is kept relatively short. If a longer validity period for global random numbers is desired, then, preferably, the mobile 20 generates a count value CT in addition to the random number $R_M$.

Specifically, when a new global random number $R_N$ is received, the mobile 20 initializes a counter included therein. Each time the mobile 20 generates a random number $R_M$ and a challenge response, the mobile 20 increments the counter to obtain the count value CT. Furthermore, the challenge response generated by the mobile 20 is $KCF_{SSDA}$ (Type, 0, $R_M$, $R_N$, DD, CT), and the mobile 20 sends the call origination request, the dialed digits DD, the count value CT, the random number $R_M$ and this challenge response to the network. The VLR 15 stores received count values from each mobile for the duration of a global random number $R_N$, and determines whether a count value CT received from a mobile exceeds the previously stored count value for that mobile. If the received count value CT does exceed the previously stored count value, then the VLR 15 goes forward with authenticating the mobile 20. If the received count value CT does not exceed the previously stored count value, the mobile 20 is not authenticated.

If the VLR 15 goes forward with authenticating the mobile 20, the VLR 15 generates and sends a challenge response of $KCF_{SSDA}$(Type, 1, $R_M$, CT). Accordingly, when using a global random number $R_N$ only two rounds of communication are needed to establish the session key. Additionally, in generating the session key, the mobile 20 and the VLR 15 calculate the session key as $PRF_{A\text{-}Key}(R_M, R_N, CT)$.

Next, the third embodiment of the present invention will be described. In conventional wireless systems, after establishing the session key, messages are transferred between the mobile 20 and the network. The third embodiment of the present invention improves communication efficiency by incorporating the initial transfer of messages as part of the communication to establish the session key.

Figure 6:
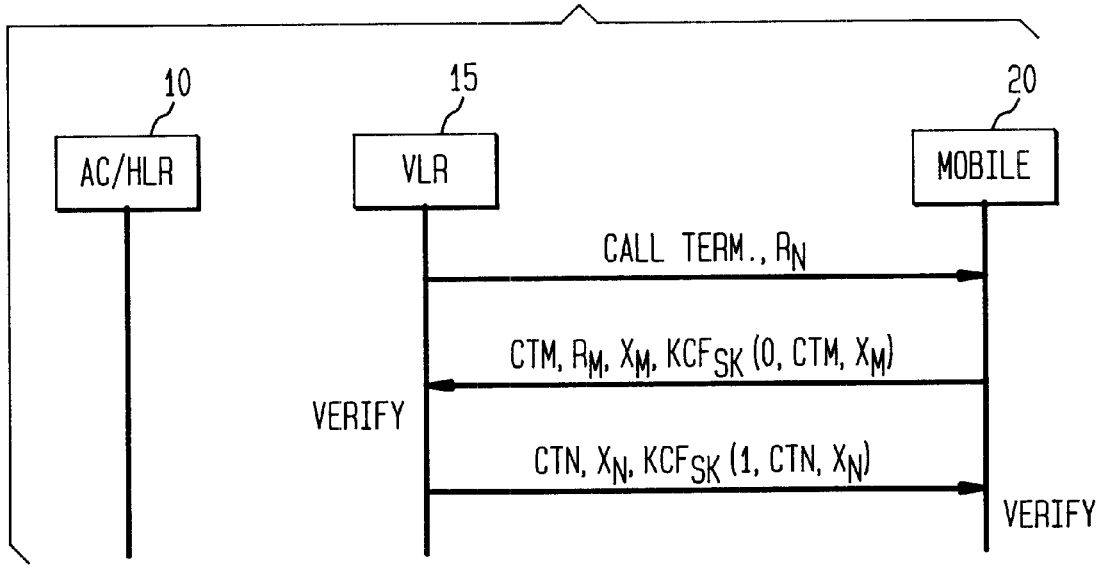
FIG. 6 illustrates the communication between the network and the mobile to establish a session key during call termination according to a third embodiment of the present invention.

FIG. 6 illustrates the communication between the network and the mobile 20 to establish a session key during call termination according to a third embodiment of the present invention. As shown, the VLR 15 generates a random number $R_N$ using a random number generator, and sends the random number $R_N$ to the mobile 20 along with a call termination request.

In response, the mobile 20 generates a random number $R_M$, and calculates a session key SK as $PRF_{A\text{-}Key}(R_M, R_N)$.

In the typical, well-known fashion, the mobile 20 also generates a message $X_M$ and a mobile message count value CTM associated therewith. Because the generation of messages and the message count value are well-known in the art, these processes will not be described in detail.

The mobile 20 then performs a KCF on the message $X_M$, the count value CTM, and the mobile id data of 0 using the session key SK as the key to generate an authentication tag. This calculation is represented as $KCF_{SK}(0, CTM, X_M)$. Preferably, the KCF is a keyed message authentication code such as HMAC, but could be a PRF such as Data Encryption Standard-Cipher Block Chaining (DES-CBC) from NIST (National Institute of Standards).

The mobile 20 sends the message count value CTM, the random number $R_M$, the message $X_M$ and the authentication tag of $KCF_{SK}(0, CTM, X_M)$ to the network. Based on the received random number $R_M$, the VLR 15 calculates the session key SK in the same manner as did the mobile 20. The VLR 15 also calculates $KCF_{SK}(0, CTM, X_M)$ based on the received message $X_M$ and the count value CTM, and determines whether this calculated value matches the version received from the mobile 20. If a match is found, the VLR 15 authenticates the mobile 20.

If the VLR 15 authenticates the mobile 20, the VLR 15 processes the message $X_M$ and the message count value CTM in the typical, well-known manner, and generates a network message $X_N$ and network message count value CTN in the typical, well-known manner. Because these processes are so well-known in the art, they will not be described in detail.

The VLR 15 further calculates an authentication tag of $KCF_{SK}(1, CTN, X_N)$, where 1 is the network id data, and sends this authentication tag to the mobile 20 along with the message $X_N$ and the message count value CTN. The mobile 20 calculates $KCF_{SK}(1, CTN, X_N)$ based on the received message $X_N$ and the count value CTN. The mobile 20 then verifies whether the calculated version of $KCF_{SK}(1, CTN, X_N)$ matches the version received from the VLR 15. If a match is found, the mobile 20 authenticates the network; and thus, the session key SK.

As an alternative, instead of generating and sending a unique random number $R_N$ to each mobile, the VLR 15 generates a global random number $R_N$; namely, the same random number for all the mobiles. In this alternative embodiment, the network sends the call termination request as a page on a control channel.

Furthermore, this alternative embodiment applies when the anticipated response time for the mobile, as monitored by the network, is kept relatively the same as when a unique random number $R_N$ is sent. Stated another way, this embodiment applies when the validity period of the global random number $R_N$ is kept relatively short. If a longer validity period for global random numbers is desired, then, preferably, the mobile 20 generates a count value CT in addition to the random number $R_M$.

Specifically, when a new global random number $R_N$ is received, the mobile 20 initializes a counter included therein. Each time the mobile 20 generates a random number $R_M$ and an authentication tag, the mobile 20 increments the counter to obtain the count value CT. Furthermore, the mobile 20 sends the count value CT along with the message count value CTM, the random number $R_M$, the message $X_M$ and the authentication tag. The VLR 15 stores received count values from each mobile for the duration of a global random number $R_N$, and determines whether a count value CT received from a mobile exceeds the previously stored count value for that mobile. If the received count value CT does exceed the previously stored count value, then the VLR 15 goes forward with authenticating the mobile 20. If the received count value CT does not exceed the previously stored count value, the mobile 20 is not authenticated. Additionally, in generating the session key, the mobile 20 and the VLR 15 calculate the session key as $PRF_{A\text{-}Key}(R_M, R_N, CT)$.

Figure 7:
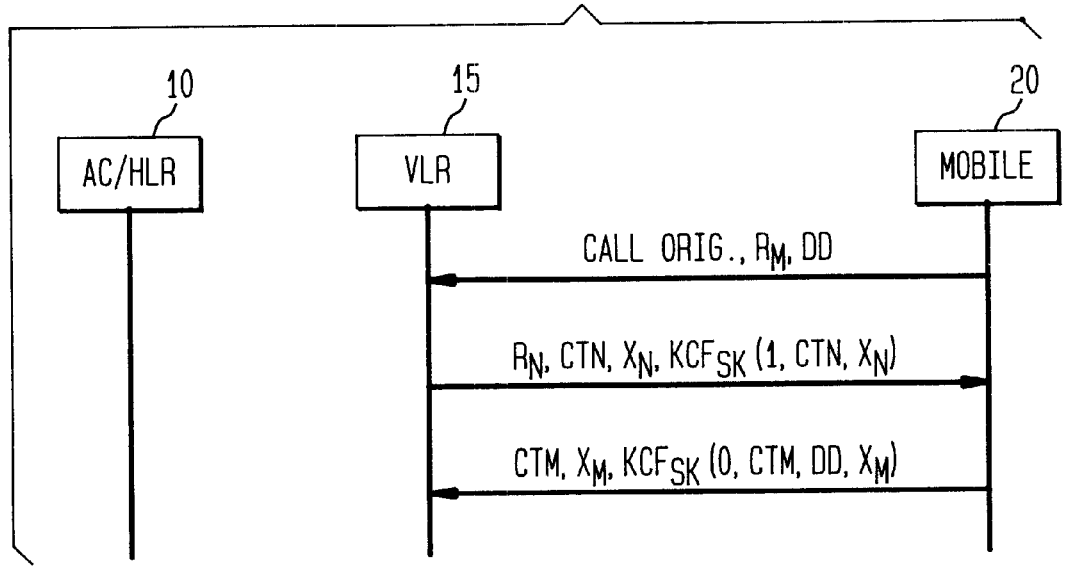
FIG. 7 illustrates the communication between the network and the mobile to establish a session key during call origination according to the third embodiment of the present invention.

FIG. 7 illustrates the communication between the network and the mobile 20 to establish a session key during call origination according to the third embodiment of the present invention. Once the dialed digits DD are received from a mobile user, the mobile 20 generates a random number $R_M$ using a random number generator. As shown, the mobile 20 sends a call origination request, the random number $R_M$ and the dialed digits DD to the VLR 15.

In response, the VLR 15 generates a random number $R_N$, and calculates a session key SK as $PRF_{A\text{-}Key}(R_M, R_N)$. In the typical, well-known fashion, the VLR 15 also generates a message $X_N$ and a mobile message count value CTN associated therewith. Because the generation of messages and the message count value are well-known in the art, these processes will not be described in detail.

The VLR 15 then performs a KCF on the message $X_N$, the count value CTN, and the network id data of 1 using the session key SK as the key to generate an authentication tag. This calculation is represented as $KCF_{SK}(1, CTN, X_N)$. The VLR 15 sends the message count value CTN, the random number $R_N$, the message $X_N$ and the authentication tag of $KCF_{SK}(1, CTN, X_N)$ to the mobile 20. Based on the received random number $R_N$, the mobile 20 calculates the session key SK in the same manner as did the VLR 15. The mobile 20 also calculates $KCF_{SK}(1, CTN, X_N)$ based on the received message $X_N$ and the count value CTN, and determines whether this calculated value matches the version received from the VLR 15. If a match is found, the mobile 20 authenticates the VLR 15.

If the mobile 20 authenticates the VLR 15, the mobile 20 processes the message $X_N$ and the message count value CTN in the typical, well-known manner, and generates a network message $X_M$ and network message count value CTM in the typical, well-known manner. Because these processes are so well-known in the art, they will not be described in detail.

The mobile 20 further calculates an authentication tag of $KCF_{SK}(0, CTM, X_M)$, where 0 is the mobile id data, and sends this authentication tag to the VLR 15 along with the message $X_M$ and the message count value CTM. The VLR 15 calculates $KCF_{SK}(0, CTM, X_M)$ based on the received message $X_M$ and the count value CTM. The VLR 15 then verifies whether the calculated version of $KCF_{SK}(0, CTM, X_M)$ matches the version received from the mobile 20. If a match is found, the VLR 15 authenticates the mobile 20; and thus, the session key SK.

As an alternative, instead of generating and sending a unique random number $R_N$ to each mobile, the VLR 15 generates a global random number $R_N$; namely, the same random number for all the mobiles.

Furthermore, this alternative embodiment applies when the anticipated response time for the mobile, as monitored by the network, is kept relatively the same as when a unique random number $R_N$ is sent. Stated another way, this embodiment applies when the validity period of the global random number $R_N$ is kept relatively short. If a longer validity period for global random numbers is desired, then, preferably, the mobile 20 generates a count value CT in addition to the random number $R_M$.

Specifically, when a new global random number $R_N$ is received, the mobile 20 initializes a counter included therein. Each time the mobile 20 generates a random number $R_M$ and an authentication tag, the mobile 20 increments the counter to obtain the count value CT. Furthermore, the mobile 20 sends the count value CT along with the call origination request. The VLR 15 stores received count values from each mobile for the duration of a global random number $R_N$, and determines whether a count value CT received from a mobile exceeds the previously stored count value for that mobile. If the received count value CT does exceed the previously stored count value, then the VLR 15 goes forward with authenticating the mobile 20. If the received count value CT does not exceed the previously stored count value, the mobile 20 is not authenticated. Additionally, in generating the session key, the mobile 20 and the VLR 15 calculate the session key as $PRF_{A\text{-}Key}(R_M, R_N, CT)$.

Unlike some conventional methods for establishing the session key, the method according to the present invention provides an added measure of security by performing mutual authentication.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A method for establishing a session key at a mobile, which has roamed into a coverage area of a network outside of the mobile's home coverage area, comprising:
   a) receiving a first code from said network, said first code being a global challenge;
   b) generating second and third codes;
   c) sending said second and third codes to said network;
   d) receiving a fourth code from said network;
   e) authenticating said network based on said fourth code; and
   f) establishing said session key based on said first and second codes if said network is authenticated.

2. The method of claim 1, further comprising:
   g) incrementing a counter upon receipt of said global challenge to obtain a count value; and wherein
   said step c) sends said count value and said second and third codes to said network; and
   said step f) establishes said session key based on said first and second codes and said count value.

3. The method of claim 1, wherein said second code is a unique challenge.

4. The method of claim 1, wherein said step b) generates said third code by performing a keyed cryptographic function on said first and second codes.

5. The method of claim 1, wherein
   said step a) receives a first random number as said first code; and
   said step b) increments a counter to obtain a count value as said second code.

6. The method of claim 5, wherein said step b) generates said third code by performing a keyed cryptographic function on said first and second codes.

7. The method of claim 1, wherein said step c) sends dialed digits to said network with said second and third codes.

8. The method of claim 7, wherein said step b) generates said third code by performing a keyed cryptographic function on said first and second codes and said dialed digits.

9. A method for establishing a session key at a network having a coverage area outside of a home coverage area of a roaming mobile, said method comprising:

a) sending a global challenge as a first code;
b) receiving second and third codes from said roaming mobile;
c) establishing a session key based on said first and second codes;
d) authenticating said roaming mobile based on said third code and said session key.

10. The method of claim 9, wherein
said step b) receives a count value; and further including,
e) storing said count value;
f) determining if said stored count value is greater than a previously stored count value; and wherein
said step c) establishes said session key based on said first and second codes and said count value if said stored count value is greater than said previously stored count value.

11. The method of claim 9, wherein said second code is a unique challenge.

12. The method of claim 9, wherein said step b) receives a result of performing a keyed cryptographic function on said first and second codes as said third code.

13. The method of claim 9, wherein
said step a) sends a first random number as said first code; and
said step b) receives a count value as said second code.

14. The method of claim 13, wherein
said step b) receives a result of performing a keyed cryptographic function on said first and second codes.

15. The method of claim 13, further comprising:
e) storing said count value;
f) determining if said stored count value is greater than a previously stored count value; and wherein
said step c) establishes said session key based on said first and second codes if said stored count value is greater than said previously stored count value.

16. The method of claim 9, wherein said step b) receives dialed digits from said roaming mobile with said second and third codes.

17. The method of claim 16, wherein said step b) receives a result of performing a keyed cryptographic function on said first and second codes and said dialed digits as said third code.

18. The method of claim 9, further comprising:
e) generating a fourth code if said mobile is authenticated; and
f) sending said fourth code to said mobile.

19. The method of claim 18, wherein said step e) generates said fourth code by performing a keyed cryptographic function on said second code.

20. A method for establishing a session key at a mobile, which has roamed into a coverage area of a network outside of the mobile's home coverage area, said method comprising:

a) receiving a first code from said network;
b) incrementing a counter to obtain a count value as a second code;
c) generating third code;
d) sending said second and third codes to said network;
e) receiving a fourth code from said network;
f) authenticating said network based on said fourth code; and
g) establishing said session key based on said first and second codes if said network is authenticated.

21. The method of claim 20, wherein said step a) receives a unique challenge as said first code.

22. The method of claim 20, wherein said step a) receives a global challenge as said first code.

23. The method of claim 20, wherein said step c) generates said third code by performing a keyed cryptographic function on said first and second codes.

24. The method of claim 20, wherein said step d) sends dialed digits to said network with said second and third codes.

25. The method of claim 24, wherein said step c) generates said third code by performing a keyed cryptographic function on said first and second codes and said dialed digits.

26. A method for establishing a session key at a network having a coverage area outside of a home coverage area of a roaming mobile, said method comprising:

a) sending a first code to said roaming mobile;
b) receiving second and third codes from a mobile, said second code being a count value;
c) establishing a session key based on said first and second codes;
d) authenticating said roaming mobile based on said third code and said session key.

27. The method of claim 26, wherein said step a) sends unique challenge as said first code.

28. The method of claim 26, wherein said step a) sends a global challenge as said first code.

29. The method of claim 26, wherein said step b) receives a result of performing a keyed cryptographic function on said first and second codes as said third code.

30. The method of claim 26, further comprising:
e) storing said count value;
f) determining if said stored count value is greater than a previously stored count value; and wherein
said step c) establishes said session key based on said first and second codes if said stored count value is greater than said previously stored count value.

31. The method of claim 26, wherein said step b) receives dialed digits from said roaming mobile with said second and third codes.

32. The method of claim 31, wherein said step b) receives a result of performing a keyed cryptographic function on said first and second codes and said dialed digits as said third code.

33. The method of claim 26 further comprising:
e) generating a fourth code if said roaming mobile is authenticated; and
f) sending said fourth code to said roaming mobile.

34. The method of claim 33, wherein said step e) generates said fourth code by performing a keyed cryptographic function on said second code.

35. A method for establishing a session key at a first party, comprising:

a) receiving a first code from a second party;
b) generating a second code;
c) establishing a session key based on said first and second codes;
d) generating a third code by performing a keyed cryptographic function on a first message using said session key;
e) sending said message and said second and third codes to said second party;
f) receiving a fourth code from said second party; and g) authenticating said session key based on said fourth code; wherein
    said first party is a roaming mobile and said second party is a network outside of a home coverage area of said roaming mobile, or
    said first party is a network outside of a home coverage area of a roaming mobile and said second party is said roaming mobile.

36. The method of claim 35, wherein said step d) generates said third code by performing said keyed cryptographic function on said first message and a message count value using said session key.

37. The method of claim 35, wherein said step f) receives a second message and said fourth code.

38. The method of claim 37, wherein said fourth code is a result of performing said keyed cryptographic function on said second message using said session key.

39. The method of claim 35, wherein said step f) receives a second message, a message count value, and said fourth code, and said fourth code is a result of performing said keyed cryptographic function on said second message and said message count value using said session key.

40. The method of claim 35, wherein said first code is a global challenge.

41. A method for establishing a session key at a first party, comprising:
    a) sending a first code to a second party;
    b) receiving a message, a second code, and a third code from said second party, said third code being a result of performing a keyed cryptographic function on said message using a session key;
    c) determining said session key based on said first and second codes; and
    d) authenticating said second party based on said third code and said session key, wherein
        said first party is a roaming mobile and said second party is a network outside of a home coverage area of said roaming mobile, or
        said first party is a network outside of a home coverage of a roaming mobile and said second party is said roaming mobile.

42. The method of claim 41, wherein said third code is a result of performing said keyed cryptographic function on said first message and a message count value using said session key.

43. The method of claim 41, further comprising:
    e) generating a fourth code if said second party is authenticated; and
    f) sending said fourth code to said second party if said second party is authenticated.

44. The method of claim 43, wherein said step f) sends a second message and said fourth code.

45. The method of claim 44, wherein said fourth code is a result of performing said keyed cryptographic function on said second message using said session key.

46. The method of claim 43, wherein said step f) sends a second message, a message count value, and said fourth code, and said fourth code is a result of performing said keyed cryptographic function on said second message and said message count value using said session key.

47. The method of claim 41, wherein said step a) sends a global challenge as said first code.

* * * * *